United States Patent
Zendejas et al.

(10) Patent No.: US 8,954,451 B2
(45) Date of Patent: Feb. 10, 2015

(54) SELECTING MICROBLOG ENTRIES BASED ON WEB PAGES, VIA PATH SIMILARITY WITHIN HIERARCHY OF CATEGORIES

(75) Inventors: Ignacio Zendejas, Mountain View, CA (US); Rajan Lukose, Oakland, CA (US); Craig Peter Sayers, Menlo Parka, CA (US); Shyam Sundar Rajaram, San Francisco, CA (US); Martin B. Scholz, San Francisco, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 788 days.

(21) Appl. No.: 12/828,240

(22) Filed: Jun. 30, 2010

(65) Prior Publication Data

US 2012/0005217 A1    Jan. 5, 2012

(51) Int. Cl.
  *G06F 7/00* (2006.01)
  *G06F 17/30* (2006.01)

(52) U.S. Cl.
  CPC .................. *G06F 17/30867* (2013.01)
  USPC ................. 707/749; 707/728; 707/758

(58) Field of Classification Search
  None
  See application file for complete search history.

(56) References Cited

U.S. PATENT DOCUMENTS

| | | | |
|---|---|---|---|
| 7,296,016 B1 * | 11/2007 | Farach-Colton et al. | 707/999.002 |
| 7,464,122 B1 * | 12/2008 | Basko et al. | 707/999.001 |
| 7,571,177 B2 * | 8/2009 | Damle | 707/999.101 |
| 7,860,855 B2 * | 12/2010 | Hussami | 707/708 |
| 8,040,548 B1 * | 10/2011 | Siegel et al. | 705/38 |
| 8,396,864 B1 * | 3/2013 | Harinarayan et al. | 707/722 |
| 2007/0100915 A1 | 5/2007 | Rose et al. | |
| 2008/0126176 A1 | 5/2008 | Iguchi | |
| 2008/0140674 A1 | 6/2008 | Ishikawa | |
| 2009/0006371 A1 | 1/2009 | Denoue et al. | |
| 2009/0171754 A1 | 7/2009 | Kane et al. | |
| 2009/0313244 A1 * | 12/2009 | Sokolenko et al. | 707/5 |
| 2010/0049663 A1 | 2/2010 | Kane, Jr. et al. | |
| 2010/0064040 A1 | 3/2010 | Wise et al. | |
| 2011/0178995 A1 * | 7/2011 | Suchter et al. | 707/692 |

OTHER PUBLICATIONS

M. Kirkpatrick, "Twitter Data & the Future of TweetDeck," www.readwriteweb.com article, Nov. 12, 2009.
F. Lardinois, "My6Sense: Personalized Reading Recommendations That Actually Work (500 Invites)," www.readwriteweb.com article, Dec. 4, 2008.
tweetmemev2 site FAQ, help.tweetmeme.com, Jan. 4, 2010.
M. Saleem, "Collaborative Filtering: Lifeblood of the Social Web," www.readwriteweb.com article, Jun. 30, 2008.
K C Sia et al., "Monitoring RSS Feeds Based on User Browsing Pattern," Procs. of ICWSM '2007, Boulder, Colo., year 2007.

* cited by examiner

*Primary Examiner* — Fred I Ehichioya
*Assistant Examiner* — Jau-Shya Meng

(57) ABSTRACT

For each web page visited, a path is determined through a hierarchy of categories. The hierarchy of categories has levels from a most abstract level to a most concrete level. For each microblog entry of a microblog, a path is determined through the hierarchy of categories. Each microblog entry for which the path is similar to the path for at least one web page is determined as a selected microblog entry.

12 Claims, 4 Drawing Sheets

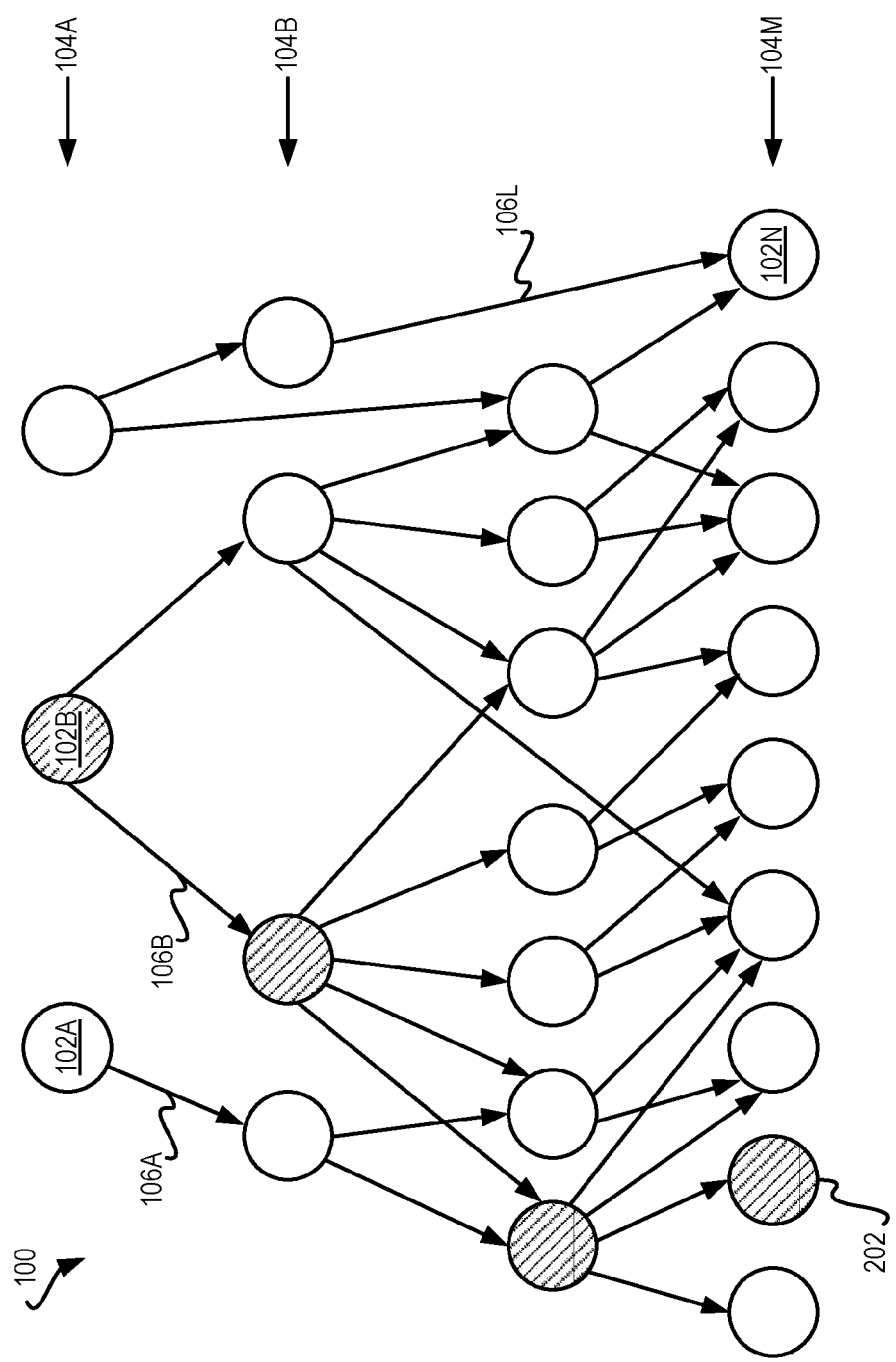

US 8,954,451 B2

SELECTING MICROBLOG ENTRIES BASED ON WEB PAGES, VIA PATH SIMILARITY WITHIN HIERARCHY OF CATEGORIES

BACKGROUND

Microblogs have become a popular online manner by which users can receive and disseminate information. A microblog service is an online service in which a user can post entries to his or her microblog, and subscribe to the microblogs of other users. Each time a user posts an entry to his or her microblog, the users that have subscribed to the microblog can receive the entry or be informed that the entry has been posted. Examples of microblogs include TWITTER, which is a registered trademark of Twitter, Inc., of San Francisco, Calif., and FACEBOOK, which is a registered trademark of Facebook, Inc., of Palo Alto, Calif.

BRIEF DESCRIPTION OF THE DRAWINGS

FIGS. 2A and 2B are diagrams depicting paths within the graph of FIG. 1 for an exemplary node of the graph, in relation to which an embodiment of the disclosure can be implemented or practiced.

DETAILED DESCRIPTION

As noted in the background section, a microblog service is an online service in which a user can post entries to his or her microblog, and subscribe to the microblogs of other users. Each time a user makes an entry to his or her microblog, the users that have subscribed to the microblog can receive the entry or be informed that the entry has been posted. A typical user may be subscribed to the microblogs of tens, hundreds, or even more, of other users.

A user that has subscribed to the microblogs of a large number of other users can become inundated by the sheer number of entries posted to these microblogs. The user may not have the time or the inclination to read each entry.

As such, the user may decide to decrease the number of microblogs of other users to which he or she is subscribed, potentially missing out on informative microblog entries. In an extreme case, the user may decide to completely stop using the microblog service in question.

Embodiments of the disclosure provide for a way to identify the microblog entries that a user is most likely to be interested in viewing, based on the web pages visited by a user. It is assumed that the web pages that a user visits are indicative of the user's interests. Therefore, microblog entries that have a degree of similarity or commonality with the web pages that the user has visited in the past are likely to be of greater interest to the user than other microblog entries.

More specifically, for each web page that a user has visited, a path through a hierarchy of categories is determined for each web page that a user has visited. A path through the hierarchy is also determined for each microblog entry of each microblog to which the user is subscribed. The microblog entries having paths that are similar to paths for the web pages that the user has visited are identified as microblog entries that the user is likely to have an interest in viewing.

Figure 1:
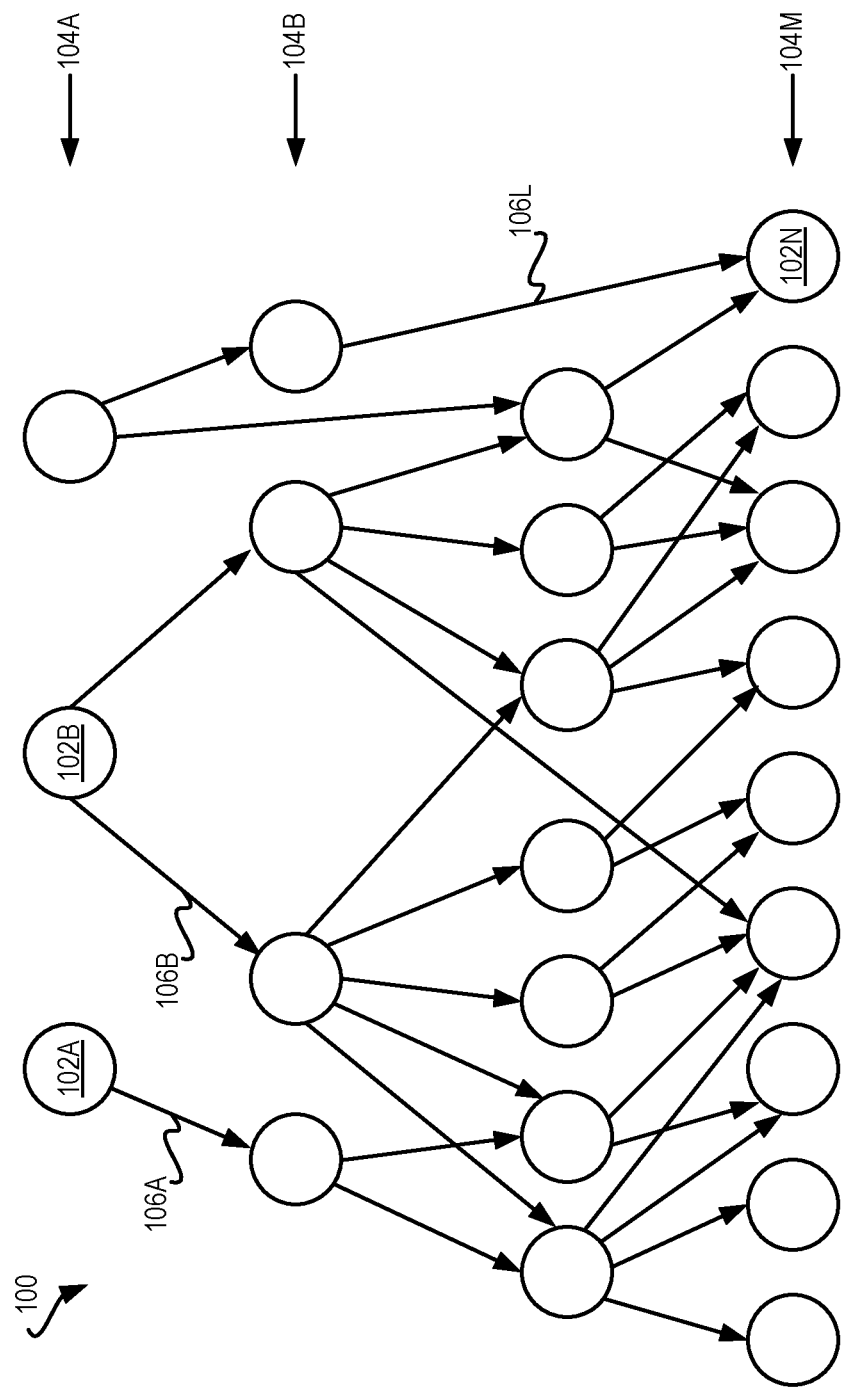
FIG. 1 is a diagram of a hierarchy of categories represented by a directed acyclic graph, in relation to which an embodiment of the disclosure can be implemented or practiced.

FIG. 1 shows a representative hierarchy of categories, in relation to which an embodiment of the disclosure can be implemented or practiced. The hierarchy of categories is represented by a directed acyclic graph 100 having a number of nodes 102A, 1028, . . . , 102N, collectively referred to as the nodes 102. The nodes 102 are organized over a number of levels 104A, 1048, . . . , 104M, collectively referred to as the levels 104. The level 104A is the most abstract and least concrete level of the hierarchy, whereas the level 104M is the least abstract and most concrete level of hierarchy. Just four levels 104 of nodes 102 are depicted in FIG. 1 for illustrative clarity and convenience.

The directed acyclic graph 100 includes directed edges 106A, 106B, . . . , 106L, collectively referred to as the directed edges 106. Each edge 106 is from a node 102 within a level 104 to a node 102 within a less abstract and more concrete level 104. A node 102 can have more than one outbound edge 106 and more than one inbound edge 106. An edge 106 from a node 102 within a level 104 does not have to transition to a node 102 within an immediately adjacent level 104, but rather can transition to a node 102 within any less abstract and more concrete level 104.

Each node 102 within each level 104 corresponds to a category organized in relation to the categories of the nodes 102 within the other levels 104. The categories to which the nodes 102 within the most concrete level 104M correspond are more specifically topics, or concepts, representing a category in which there are no further sub-categories. The edges 106 correspond to relationships among the categories of the nodes 102 within the levels 104. Specifically, an edge 106 from a first node 102 to a second node 102 indicates that the second node 102 represents a sub-category of the category represented by the first node 102.

The hierarchy can be for an online encyclopedia like WIKIPEDIA, which is a trademark of the Wikipedia Foundation, of San Francisco, Calif. For example, consider the topic or concept corresponding to the encyclopedia entry for "Hillary Rodham Clinton." This topic or concept may be categorized within the category "Living People," which itself is within the category "People by Status," which is itself within the category "People."

Therefore, there is a node 102 for the category "Living People" within a level 104, which has a directed edge 106 to a node 102 for the category "People by Status" within a less abstract level 104. The node 102 for the category "People by Status" has a directed edge 106 to a node 102 for the category "Living People" within an even less abstract level 104. The node 102 for the category "Living People" has a directed edge 106 to a node 102 for the topic or concept "Hillary Rodham Clinton" within the least abstract and most concrete level 104M. The collection of these nodes 102 within the levels 104 and their associated edges 106 is a path through the directed acyclic graph 100, and thus through the hierarchy of categories, for the entry "Hillary Rodham Clinton."

The topic or concept corresponding to an entry may be categorized by more than one path through the hierarchy of categories. For example, the topic or concept corresponding to the encyclopedia entry for "Hillary Rodham Clinton" may also be considered within the category "US Presidential Candidates," which itself is within the category "Government in the US," which is itself in the category "Government by Country." The category "Government by Country" may be in the category "Government," which is itself in the category "Politics," which is itself in the category "Society."

For a given concept, there are thus one or more paths through the hierarchy of categories that end at the concept. Each path is a unique collection of nodes 102 starting at the most abstract level 104A and proceeding through the nodes 102 of the levels 104, via the directed edges 106, to end at a node 102 that corresponds to the concept within the most concrete level 104. Each path therefore includes at least two nodes 102: a node 102 within the most abstract level 104A, and a node 102 corresponding to the concept within the most concrete level 104.

Figure 2A:
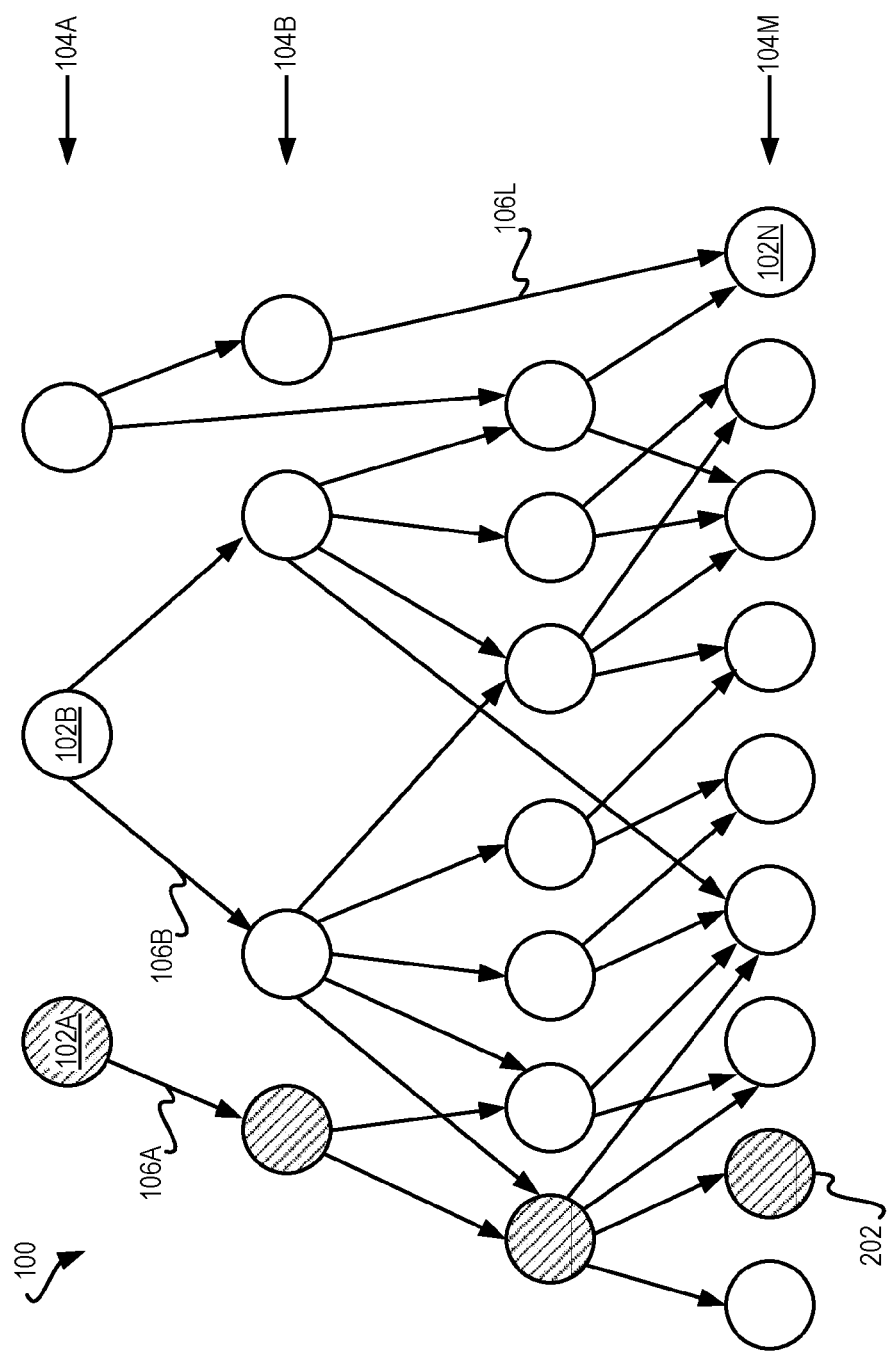

FIGS. 2A and 2B show paths for an exemplary node 202 within the directed acyclic graph 100, in relation to which an embodiment of the disclosure can be implemented or practiced. In each of FIGS. 2A and 2B, the path includes the nodes 102 that are shaded, and the edges 106 that connect consecutive shaded nodes 102 together. Therefore, FIGS. 2A and 2B illustrate how there can be more than one path through the hierarchy of categories represented by the directed acyclic graph 100 for a concept or topic that has a corresponding node 102 within the most concrete level 104M.

In one embodiment, the construction of a hierarchy of categories and the determination of paths through the hierarchy for a concept or topic can be achieved in accordance with the patent application entitled "Determining at least one category path for identifying input text," filed on Nov. 6, 2009, and assigned Ser. No. 12/614,260. The hierarchy of categories may be pre-specified. Determining the paths through the hierarchy for a concept or topic may be achieved by starting at the concept or topic within the hierarchy, and iteratively working backwards to the most abstract level of the hierarchy to discover all the paths for the concept or topic in question.

Figure 3:
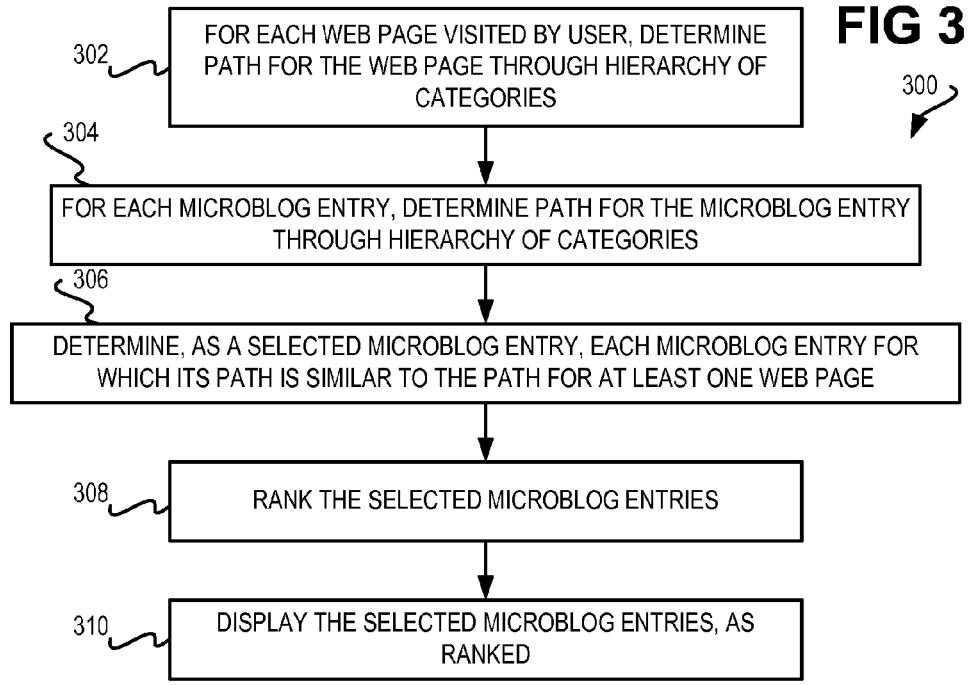
FIG. 3 is a flowchart of a method for determining which microblog entries to display to a user based on the web pages that the user has visited, according to an embodiment of the disclosure.

FIG. 3 shows a method 300 for using web pages visited by a user, in conjunction with a hierarchy of categories, to determine selected microblog entries to display to the user, according to an embodiment of the disclosure. The method 300 may be implemented as one or more computer programs stored on a computer-readable data storage medium. Execution of the computer programs by a processor of a computing device, like a computer, results in performance of the method 300.

For each web page that has been visited by a user, at least one path for the web page through a hierarchy of categories is determined (302). The web pages that have been visited by a user can be obtained by acquiring the web browsing history of the user. For example, in most common web-browsing computer programs, a history of the web pages that a user has visited (i.e., browsed) is maintained.

It is noted that the term user is employed generally herein. A user can include a physical person that uses a computing device. However, a user can also include the computing device that such a physical person uses. That is, that a user has visited a web site means that a person has used a computing device in such a way to cause the computing device to communicate with another computing device hosting the web site. The computing device that the person uses in this way thus can be considered the user in one embodiment.

In one embodiment, determining the paths for a web page through the hierarchy of categories is achieved as follows. A key phrase for the web page is determined. The key phrase is a relatively small number of words that best represents the subject matter of the web page. For example, the title of the web page may be its key phrase. As another example, the content of the web page may be analyzed to determine a set of words that best represent the web page's content, where this set of words is the key phrase.

Next, a concept or topic within the most concrete and least abstract level of the hierarchy of categories that best corresponds to the key phrase is determined. For instance, the percentage of the words of the key phrase that are present in each concept or topic may be determined, and the concept or topic having the greatest percentage of the words of the key phrase selected. For a hierarchy of categories corresponding to an online encyclopedia, the words of the key phrase may be matched to the words of the title of each entry within the encyclopedia, for example, or to the words within each entry.

The paths through the hierarchy of categories to the concept or topic that corresponds to the key phrase of the web page are then determined. As noted above, for a hierarchy of categories represented by a directed acyclic graph, the paths to a concept or topic can be determined by starting at the node corresponding to the concept or topic, and iteratively traversing the graph until the most abstract and least concrete level is reached. Each unique collection of directed edge-connected nodes within the graph that includes the node representing the concept or topic is a path.

The most abstract level of the hierarchy of categories is the top level of the hierarchy, whereas the most concrete level of the hierarchy of categories is the bottom level of the hierarchy. Stated another way, the most abstract level of the hierarchy of categories includes those nodes within the directed acyclic graph that do not have any directed edges pointing to them. By comparison, the most concrete level of the hierarchy of categories includes those nodes within the directed acyclic graph that do not have any directed edges pointing from them.

In general, the hierarchy of categories is organized from a most abstract level to a most concrete level, as noted above. Thus, if the first level of the hierarchy is considered the most abstract level, then the second level is less abstract and more concrete than the first level, the third level is less abstract and more concrete than the second level, and so on. Likewise, if the last level of the hierarchy is considered the most concrete level, then the second-to-last level is more abstract and less concrete than the last level, and the third-to-last level is more abstract and less concrete than the second-to-last level, and so on.

Each category, or concept, encompassed by the most concrete level belongs to at least one category within the most abstract level, and typically to at least one category within one or more levels that are more abstract than the most concrete level but more concrete than the most abstract level. As an example, consider a hierarchy of categories directed to dogs. The most abstract level may have one category, corresponding to dogs as a whole. The most concrete level may have concepts, or categories, corresponding to particular species of dogs. A middle level that is less abstract and more concrete than the most abstract level but that is more abstract and less concrete than the most concrete level may have categories corresponding to groups of dogs, such as working dogs, toy dogs, and so on.

For each microblog entry of a microblog to which the user is subscribed, at least one path through the hierarchy of categories for the microblog entry is also determined (304). The microblog entries may be unique posts, including status updates, pictures, video, and links to web pages. The microblog entries for which part 304 is performed may be those microblog entries that have been added since the last time the user viewed any microblog entry from the microblog or microblogs in question. That is, part 304 may be performed for new microblog entries. Part 304 may be performed periodically, or as new microblog entries are generated.

In one embodiment, determining the paths for a microblog entry is achieved in the same way that the paths for a web page are determined, as has been described above. For a microblog entry that includes a link to a web page, the paths for this web page may be determined as the paths for the microblog entry.

For a microblog entry that includes a link to a picture or a video, the paths for the microblog entry may be determined based on the description for the picture or the video in question.

Each microblog entry that has a path similar to a path for at least one web page is determined as a selected microblog entry (306). Where the hierarchy of categories is represented as a directed acyclic graph, two paths are said to have a degree of similarity according to the number of nodes they share, the distance between them, or by using any other type of similarity function. The distance between two paths may be determined in any of a number of different ways, such as by determining the graph distance between their nodes. In this case, smaller distances represent a higher similarity score and as such, two identical paths have the maximum similarity score. The similarity between two paths can also be determined using probabilistic models or clustering algorithms. For example, paths may be clustered into the same group if they co-occur frequently within a given set of web pages, microblog entries, or user profiles. The selected microblog entries are therefore those entries that the user is likely to have an interest in viewing, based on the user's history of visited web pages. In one embodiment, two paths can be considered as being similar to one another where they intersect one another—that is, where there the two paths share at least one common node.

In one embodiment, the selected microblog entries are ranked (308). Ranking the selected microblog entries is particularly useful where there are a large number of selected microblog entries, such that it is unlikely the user will have the time or inclination to review all the selected entries. The selected microblog entries may be ranked in accordance with any of a number of different approaches.

One approach by which to rank the selected microblog entries is based on the similarity scores between the paths for the visited web pages and the paths for the selected microblog entries. Therefore, a selected microblog entry that has paths that are most similar to paths for the visited web pages has a higher rank than a selected microblog entry that has paths that have a smaller similarity score with the visited web pages.

A selected microblog entry may alternatively or additionally be ranked according to the most recent time the user has visited any of the web pages that have paths that are similar to the path for the selected entry. For example, the most recently visited web page that has a path that a path for a first selected microblog entry overlaps may have been visited by the user yesterday, whereas the most recently visited web page that has a path that a path for a second selected microblog entry overlaps may have been visited by the user last week. Therefore, the first selected microblog entry has a higher rank than the second selected microblog entry.

An alternative or additional approach by which to rank the selected microblog entries is based on the popularity of the selected microblog entries. The popularity of a microblog entry may be determined by the number of times other users have forwarded the entry, and/or by the number of times the entry has received favorable feedback by other users. An example of the former in relation to TWITTER is known as "retweeting," in which a user posts a microblog entry of another user as if it were his or her own. An example of the latter in relation to FACEBOOK is known as "liking," in which a user indicates that he or she likes a particular microblog entry of another user.

The selected microblog entries, as ranked, are then displayed to the user (310). This can mean that just some of the selected microblog entries are displayed. For example, just the selected microblog entries that have a rank greater than a predetermined threshold rank may be displayed. As another example, a predetermined number of selected microblog entries that have the highest ranks may be displayed.

The display of the selected microblog entries to the user in part 310 may be achieved when the user logs onto the web site of the microblog service in question. The user may have specified that just the selected microblog entries be displayed by default. The display of the selected microblog entries to the user in part 310 may also be achieved via sending the user emails or text messages regard the selected entries. The user may have specified that just the selected microblog entries be sent via emails or text messages.

When displaying entries, they can be grouped according to the categories or concepts determined in part 304, which are then used to index the entries. This can be done via a navigational menu that links to pages for each category and concept, by organizing them into sections within a page, or by using other layout methods. Moreover, this form of indexing enables the user to search for entries based on a particular set of categories or concepts.

Figure 4:
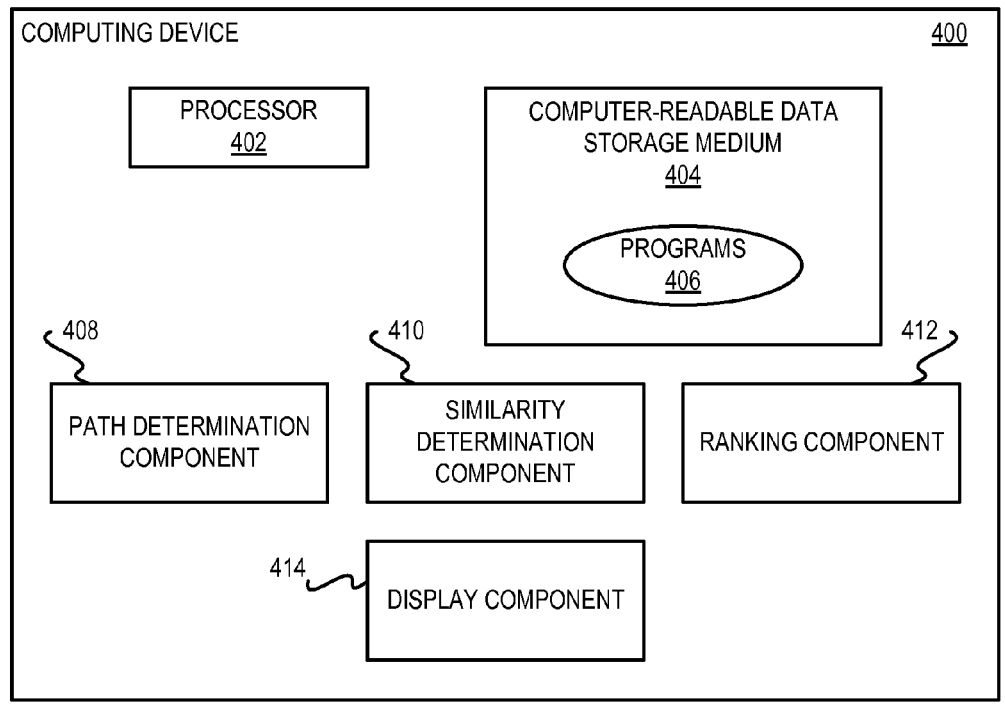
FIG. 4 is a diagram of a rudimentary system, according to an embodiment of the disclosure.

In conclusion, FIG. 4 shows a rudimentary system 400, according to an embodiment of the disclosure. The system 400 is implemented in FIG. 4 as a single computing device 402, but in other embodiments may be implemented over a number of such computing devices. The computing device 402 includes a processor 403, a computer-readable data storage medium 404, and typically other hardware in addition to the processor 403 and the medium 404. The computer-readable data storage medium 404 may be or include volatile media, such as semiconductor memory, and/or non-volatile media, such as hard disk drives.

The computer-readable data storage medium 404 stores one or more computer programs 406. The system 400 includes a number of components 408, 410, 412, and 414. The components 408, 410, 412, and 414 are said to be implemented by the computer programs 406. That is, execution of the computer programs 406 by the processor 403 from the computer-readable data storage medium 404 results in performance of the functionality of the components 408, 410, 412, and 414. It thus can be said that the components 408, 410, 412, and 414 are implemented at least via hardware, insofar as the processor 403 and the computer-readable data storage medium 404 are hardware, where the processor 403 executes the computer programs 406 from the medium 404 that results in performance of the functionality of the components 408, 410, 412, and 414.

The component 408 is a path determination component. The component 408 determines the path for each web page that has been visited (i.e., viewed) by a user, and also the path for each microblog entry of a microblog to which the user is subscribed. In this respect, the component 408 performs parts 302 and 304 of the method 300 of FIG. 3.

The component 410 is a similarity determination component. The component 410 determines the selected microblog entries as those microblog entries that have paths that are similar to the paths of the web pages visited by the user. In this respect, the component 410 performs part 306 of the method 300 of FIG. 3.

The component 412 is a ranking component. The component 412 ranks the selected microblog entries, and thus performs part 308 of the method 300 of FIG. 3. Finally, the component 414 is a display component. The component 414 displays the selected microblog entries, and thus performs part 310 of the method 300.

We claim:

1. A method comprising:

determining a plurality of first paths for a plurality of web pages visited by a user, by a computing device, through a hierarchy of categories having a plurality of levels from a most abstract level to a most concrete level, such that each web page has an associated first path through the hierarchy of categories, by, for each web page, determining a key phrase of the web page, determining one category within the hierarchy that best corresponds to the key phrase, and determining the associated first path through the hierarchy to the one category;

determining a plurality of second paths for a plurality of microblog entries of a plurality of different microblogs subscribed by and accessible to the user, by the computing device, through the hierarchy of categories, such that each microblog entry has an associated second path through the hierarchy of categories, by, for each microblog entry, determining a key phrase of the microblog entry, determining one category within the hierarchy that best corresponds to the key phrase, and determining the associated second path through the hierarchy to the one category;

identifying one or more selected microblog entries from the microblog entries accessible to the user, by the computing device, by comparing the second paths of the microblog entries through the hierarchy of categories to the first paths of the web pages through the hierarchy of categories, to present to the user as the microblog entries, of the different microblogs to which the user has subscribed, and in which the user is likely to have greater interest, based on the web pages that the user has visited serving as an indication of interests of the user; and ranking the selected microblog entries based at least on the first paths for the web pages with which the second paths for the selected microblog entries are similar such that each selected microblog entry has a ranking corresponding to a similarity score between the second paths for the microblog entries and the first paths for the web pages.

2. The method of claim 1, wherein the hierarchy of categories is represented as a directed acyclic graph in which each category is represented by a node within the graph, wherein for each node within each level except the most concrete level, the directed acyclic graph includes one or more directed edges from the node to one or more other nodes within one or more less abstract levels, wherein the most abstract level includes the nodes within the directed acyclic graph to which none of the directed edges point, wherein the most concrete level includes the nodes within the directed acyclic graph from which none of the directed edges point, and wherein each edge within the directed acyclic graph points from a first node to a second node such that the first node is more abstract and less concrete than the second node.

3. The method of claim 1, wherein the hierarchy of categories is a hierarchy of categories of an online encyclopedia.

4. The method of claim 1, wherein ranking the selected microblog entries based at least on the first paths for the web pages with which the second paths for the selected microblog entries are similar to comprises:

ranking the selected microblog entries such that selected microblog entry has a ranking corresponding to a most recent time any of the web pages that have first paths that are similar to the second paths for the selected microblog entries have been viewed.

5. The method of claim 1, wherein ranking the selected microblog entries comprises ranking the selected microblog entries based at least on popularity of the selected microblog entries.

6. The method of claim 5, wherein the popularity of each selected microblog entry is based on one or more of:

a number of times the microblog entry has been forwarded; and, a number of times the microblog entry has received favorable feedback.

7. The method of claim 1, wherein determining the second path for each microblog entry through the hierarchy of categories comprises:

where the microblog entry is a link to a particular web page, determining a path for the particular web page through the hierarchy of categories as the second path for the microblog entry.

8. The method of claim 1, wherein each selected microblog entry has an associated second path through the hierarchy of categories that is similar to an associated first path through the hierarchy of categories of at least one web page of the plurality of web pages.

9. The method of claim 8, wherein the one or more selected microblog entries are identified based on the web pages visited by the user.

10. The method of claim 1, wherein the different microblogs include a given microblog having one or more microblog entries that are identified as some of the microblog entries in which the user is likely to have greater interest, and one or more other microblog entries that are not identified as some of the microblog entries in which the user is likely to have greater interest.

11. A system comprising:

hardware; including a processor, and a memory to store instructions executed by the processor to:

determine a plurality of first paths for a plurality of web pages visited by a user through a hierarchy of categories having a plurality of levels from a most abstract level to a most concrete level, such that each web page has an associated first path through the hierarchy of categories, by, for each web page, determining a key phrase of the web page, determining one category within the hierarchy that best corresponds to the key phrase, and determining the associated first path through the hierarchy to the one category;

determine a plurality of second paths for a plurality of microblog entries of a plurality of different microblogs subscribed by and accessible to the user through the hierarchy of categories, such that each microblog entry has an associated second path through the hierarchy of categories, by, for each microblog entry, determining a key phrase of the microblog entry, determining one category within the hierarchy that best corresponds to the key phrase, and determining the associated second path through the hierarchy to the one category;

identify one or more selected microblog entries from the microblog entries accessible to the user, by comparing the second paths of the microblog entries through the hierarchy of categories to the first paths of the web pages through the hierarchy of categories, to present to the user as the microblog entries, of the different microblogs to which the user has subscribed, and in which the user is likely to have greater interest, based on the web pages that the user has visited serving as an indication of interests of the user; and rank the selected microblog entries based at least on the first paths for the web pages with which the second paths for the selected microblog entries are similar such that each selected microblog entry has a ranking corresponding to a similarity score between the second paths for the microblog entries and the first paths for the web pages.

12. A non-transitory computer-readable data storage medium having one or more computer programs stored thereon, execution of the computer programs causing a method to be performed, the method comprising:

determining a plurality of first paths for a plurality of web pages visited by a user, by a computing device, through a hierarchy of categories having a plurality of levels from a most abstract level to a most concrete level, such that each web page has an associated first path through the hierarchy of categories, by, for each web page, determining a key phrase of the web page, determining one category within the hierarchy that best corresponds to the key phrase, and determining the associated first path through the hierarchy to the one category;

determining a plurality of second paths for a plurality of microblog entries of a plurality of different microblogs subscribed by and accessible to the user, by the computing device, through the hierarchy of categories, such that each microblog entry has an associated second path through the hierarchy of categories, by, for each microblog entry, determining a key phrase of the microblog entry, determining one category within the hierarchy that best corresponds to the key phrase, and determining the associated second path through the hierarchy to the one category;

identifying one or more selected microblog entries from the microblog entries accessible to the user, by the computing device, by comparing the second paths of the microblog entries through the hierarchy of categories to the first paths of the web pages through the hierarchy of categories, to present to the user as the microblog entries, of the different microblogs to which the user has subscribed, and in which the user is likely to have greater interest, based on the web pages that the user has visited serving as an indication of interests of the user; and ranking the selected microblog entries based at least on the first paths for the web pages with which the second paths for the selected microblog entries are similar such that each selected microblog entry has a ranking corresponding to a similarity score between the second paths for the microblog entries and the first paths for the web pages.

\* \* \* \* \*